June 16, 1936.   A. R. LOCKE   2,044,006
CONTROL SYSTEM
Filed May 14, 1932
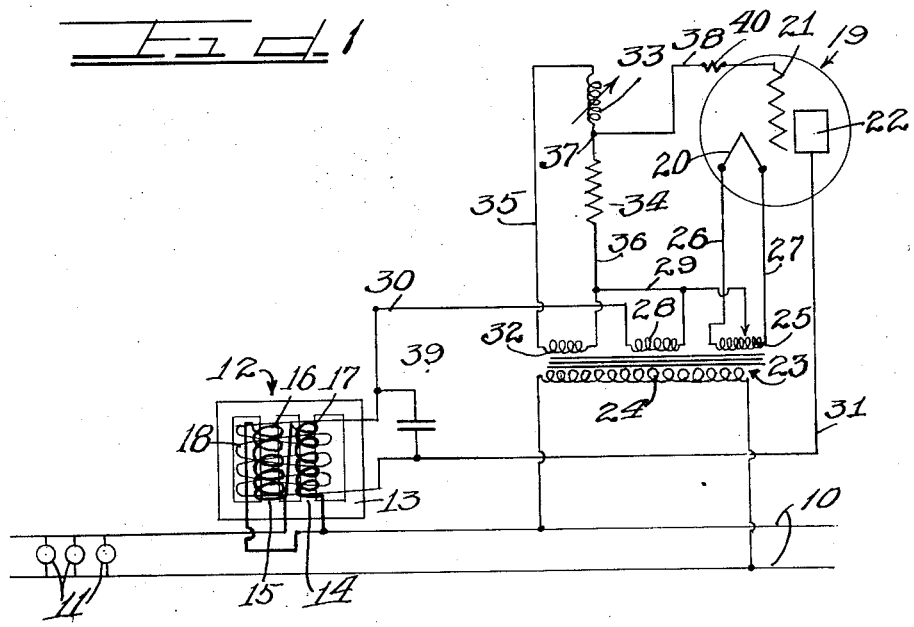
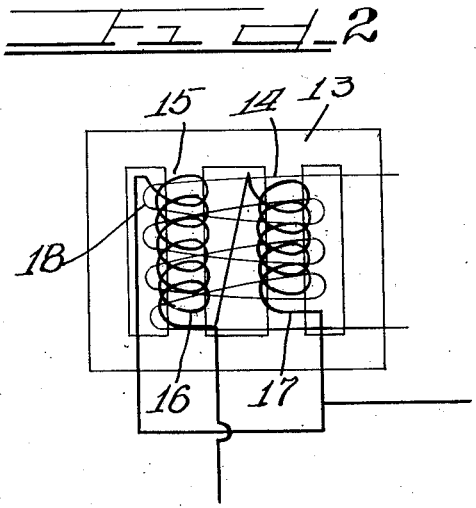
Inventor
Albert R. Locke Patented June 16, 1936

2,044,006

UNITED STATES PATENT OFFICE 2,044,006

CONTROL SYSTEM

Albert R. Locke, Oak Park, Ill.

Application May 14, 1932, Serial No. 611,337

9 Claims. (Cl. 175—312)

This invention relates to improvements in control systems for regulating, as described, various characteristics in electrical circuits, the invention being highly desirable for use in theater lighting and similar power distribution installations, although the invention has many and various uses and purposes as will be apparent to one skilled in the art.

The invention herein described is, in certain aspects, more fully described in my copending application entitled "Lighting control system", filed July 5, 1932, and having Serial No. 620,843.

It is an object of this invention to provide a simplified system, including a thermionic tube, through which the characteristics of the load circuit are controlled, and which system may be operated substantially instantaneously upon energization of the tube with desired immediate functioning of the load.

Another object of this invention is to provide a system wherein characteristics of the load circuit are controlled through a thermionic tube, and wherein the load may be controlled as desired immediately upon energization of the tube.

It is another object of this invention to provide a system including a thermionic tube as a controlling element for varying the functioning of the load circuit, the tube and the load both being supplied with alternating current.

It is also an object of this invention to provide a system including a lighting circuit, wherein the characteristics of the load circuit are controlled by means including a thermionic tube having a plurality of electrodes each fed with alternating current.

It is still a further object of this invention to provide a new and novel method of controlling characteristics of a load circuit.

While some of the more salient features, characteristics and advantages of the present invention have been pointed out above, others will become apparent from the following disclosures.

The invention includes these and other features, principles and steps hereinafter described, a preferred form of the invention being shown in the drawing, as more particularly indicated by the claims.

On the drawing:

Figure 1 is a schematic wiring diagram of a circuit embodying principles of the present invention.

Figure 2 is an enlarged diagrammatic view illustrating a reactor and connections therefor as the same is used in Figure 1.

As shown on the drawing:

On the illustrated embodiment of this invention, the numerals 10 indicate alternating current supply lines for a lighting load made up of lamps 11 variously disposed in a theatre or auditorium.

A reactor, indicated generally by the numerals 12, is connected in series with the load so that the lamps may be dimmed by suitably varying the impedance of the reactor.

The reactor may be of various types, and in the form shown it comprises a shell-type core 13 having a pair of inner limbs 14 and 15 on which the load coils 16 and 17 are wound, one on each limb, and a control coil 18 straddles the limbs and the load coils. It is advantageous to connect the load coils in parallel, and in magnetic opposition to each other. The group of load coils is inserted in series with the lighting load.

An electronic tube 19, having a cathode 20, a control grid 21, and a plate 22, is energized by a transformer 23 which has its primary winding 24 connected to the supply lines 10. The transformer 23 has a secondary winding 25 which is connected to the cathode 20 by leads 26 and 27 to heat the cathode.

A secondary winding 28 is connected at one end by a lead 29 to the electrical mid-point of the winding 25, and is connected at the other end by a lead 30 to one end of the control coil 18 and then by a lead 31 from the other end of the control coil to the plate 22. Of course, retaining the electrical mid-point connection, a second tube may be paralleled with the tube 19 whereby the system will continue in operation if an injury occurs to one tube.

A secondary winding 32 is connected at one end by the lead 29 to the electrical midpoint of the winding 25. A variable reactor 33 and a resistor 34 are connected in series across the winding 32 by leads 35 and 36. At the junction 37 of the reactor and the resistor, the grid 21 is connected by a lead 38.

It will be obvious that, as the reactance of the reactor 33 is varied, the potential of the junction point 37 will also vary, and that the phase relation of the potential applied to the grid will vary with respect to that of the cathode and plate potentials. It will be equally obvious that the potential of the junction point 37 may be varied by varying the resistance of the resistor 34, or by suitably varying both the reactor and the resistor. A relatively high resistance 40 is connected in series with the grid 21 to prevent a flow of current in the grid circuit in the event of an accidental overload in the tube circuit.

It has been found advantageous to employ an inductive reactor 33 having an iron core, and to vary the reactance of the reactor by variously positioning the core with respect to the coil of the reactor.

The effect of a potential on the grid or the plate current of a thermionic tube is now well understood by those familiar with the art, and it will be obvious that the polarity of the grid potential must be chosen with respect to the plate potential when the circuits are initially connected to obtain proper control of the plate current.

The reactor 12, the tube 19, and the transformer 23 may be assembled as a unit and suitably placed in a theatre, or the like, with control of the dimming of the load circuit obtained at some remote point by adjusting the resistor 34 or reactor 33 at that point. It has been found advantageous to connect a condenser 39, having a capacitance suitably chosen with respect to the constants of the reactor 12, across the terminals of the control coil 18. The condenser 39 may be omitted or so chosen as to capacitance that, while satisfactory control of the lighting circuit is obtained by varying the potential of the control grid 21, the lighting circuit may be protected against abnormal currents due to short circuits therein by the magnetic leakage of the reactor.

In the operation of the preferred embodiment of the invention, when the reactance of the inductive reactor 33 is minimum the lamps of the lighting load are "out" and they become increasingly brighter as the reactance of the reactor 33 is increased.

It will be obvious that this is brought about by an increase in plate current through the control coil 18 as the grid potential is lowered with increase of the reactance of the reactor 33.

It will now be apparent that control of the voltage of the terminals of the lamps of the lighting load may be had at some remote point by simple manual movement of a small iron core.

In a preferred arrangement, the thermionic tube 19 is of the electron or non-gaseous type, employing a filament cathode, so that, upon connecting the primary of the transformer 23 to the supply lines, the tube is almost instantaneously operative to control the load characteristics.

Knowing that he can obtain almost instantaneous control of the lighting circuit upon energization of the control unit, the operator is encouraged to save energy and the life of the tube by cutting the unit out of service for even short periods during which control is not necessary.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination, alternating current supply lines, a reactor, a load circuit for connection to said lines in series with said reactor, an electronic tube having electrodes in circuit connection with said reactor to vary the impedance of said reactor, means to impress alternating potentials on electrodes of said tube, and means to vary the phase relation of the potentials applied to said electrodes relative to each other to thereby vary the impedance of said reactor.

2. In combination, a source of alternating current, a load circuit for connection to said source, a reactor in series with said load circuit, said reactor having a control winding, an electronic tube having a grid and a plate, wires connecting said plate and said control winding in series with a source of alternating current, a resistor and a reactor connected in series across a source of alternating current, and a wire connecting said grid to the junction point of said resistor and said reactor.

3. In combination, a source of alternating current, a load circuit for connection to said source, a reactor in series with said load circuit, said reactor having a control winding, a condenser connected in parallel with said control winding, an electronic tube having a grid and a plate, wires connecting said plate and said control winding in series with a source of alternating current, a resistor and a reactor connected in series across a source of alternating current, and a wire connecting said grid to the junction point of said resistor and said reactor.

4. In combination, a source of alternating current, a lighting circuit for connection to said source, means to condition said lighting circuit to thereby vary the illumination afforded by the lamps of said circuit, said means comprising a reactor in series with said lighting circuit, said reactor having a control winding, an electronic tube having a grid and a plate, wires connecting said plate and said control winding in series with a source of alternating current, an impedance comprising a resistor and a reactor connected in series across a source of alternating current, a wire connecting said grid to a point intermediate the ends of said impedance, and means to vary said impedance at will to thereby vary the potential of said grid.

5. In combination, alternating current supply lines, a lighting circuit connected to said supply lines, reactor means, said reactor means comprising coils in series with said lighting circuit and control coil means magnetically coupled to said series coils, a source of pulsating current connected to said control coil means to vary the impedance of said reactor means, said source including an electronic tube of the non-gaseous type having a cathode, a grid and an anode connected with circuits defining input and output circuits of said tube, sources of alternating currents energizing said input and output circuits, respectively, and means in the input circuit of said tube to vary the energization of said tube and thereby control circuit flow to said control coil.

6. In combination, alternating current supply lines, a lighting circuit connected to said supply lines, reactor means, said reactor means comprising coils connected in series with said lighting circuit and control coil means magnetically coupled to said series coils, a capacitor connected in parallel with said control coil means, a source of pulsating current connected to said control coil means to vary the impedance of said reactor means, said source including an electronic tube of the non-gaseous type having a cathode, a grid and an anode connected with circuits defining input and output circuits of said tube, sources of alternating currents energizing said input and output circuits, respectively, and means in the input circuit of said tube to vary the energization of said tube and thereby control current flow to said control coil.

7. In combination, alternating current supply lines, a lighting circuit connected to said lines, a magnetic core having a pair of outer limbs and a pair of inner limbs in magnetic circuit relation to each other, a winding on each of said inner limbs, said windings being connected in parallel and in opposed relation, and being connected as a group in series with said lighting circuit, a control coil enveloping both of said windings, a capacitor in parallel with said control coil, a source of alternating current connected to said control coil, and a half-wave rectifier connected between said source and said coil whereby pulsating current is supplied to said coil.

8. In combination, alternating current supply lines, a lighting circuit connected to said supply lines, reactor means, said reactor means comprising coils in series with said lighting circuit and control coil means magnetically coupled to said series coils, means in circuit with said control coil means to vary the impedance of said reactor means at will and including an electron tube of the non-gaseous type provided with a cathode, a grid and an anode connected with circuits defining input and output circuits of said tube, said control coil means being connected in the output circuit of said tube, a plurality of sources of alternating potential connected energizing said input and output circuits, respectively, and means in the input circuit of said tube to vary the energization of said tube and thereby control current flow to said control coil.

9. In combination, alternating current supply lines, a lighting circuit connected to said lines, a reactor in series with said lighting circuit, said reactor having a control winding, an electron tube of the non-gaseous type having a cathode, a grid and an anode connected with circuits defining input and output circuits for said tube, wires connecting said control winding and said plate in series across a source of alternating current, an impedance comprising a resistor and a reactor connected in series across a source of alternating current wires connecting said resistor in the input circuit of said tube, and means to vary the reactance of said last-named reactor at will.

ALBERT R. LOCKE.

DISCLAIMER 2,044,006.—*Albert R. Locke*, Oak Park, Ill. CONTROL SYSTEM. Patent dated June 16, 1936. Disclaimer filed February 28, 1940, by the assignee, *Westinghouse Electric & Manufacturing Company*.
Hereby enters this disclaimer to claim 3 in said specification.
[*Official Gazette March 26, 1940.*]

DISCLAIMER 2,044,006.—*Albert R. Locke*, Oak Park, Ill. CONTROL SYSTEM. Patent dated June 16, 1936. Disclaimer filed December 5, 1940, by the assignee, *Westinghouse Electric & Manufacturing Company*.

Hereby enters this disclaimer to claims 1, 2, and 9.

[*Official Gazette December 31, 1940.*]